Nov. 15, 1932.  LE ROY S. DUNHAM ET AL  1,887,624
MAGNETO ELECTRIC GENERATOR
Filed Nov. 4, 1930  3 Sheets-Sheet 1
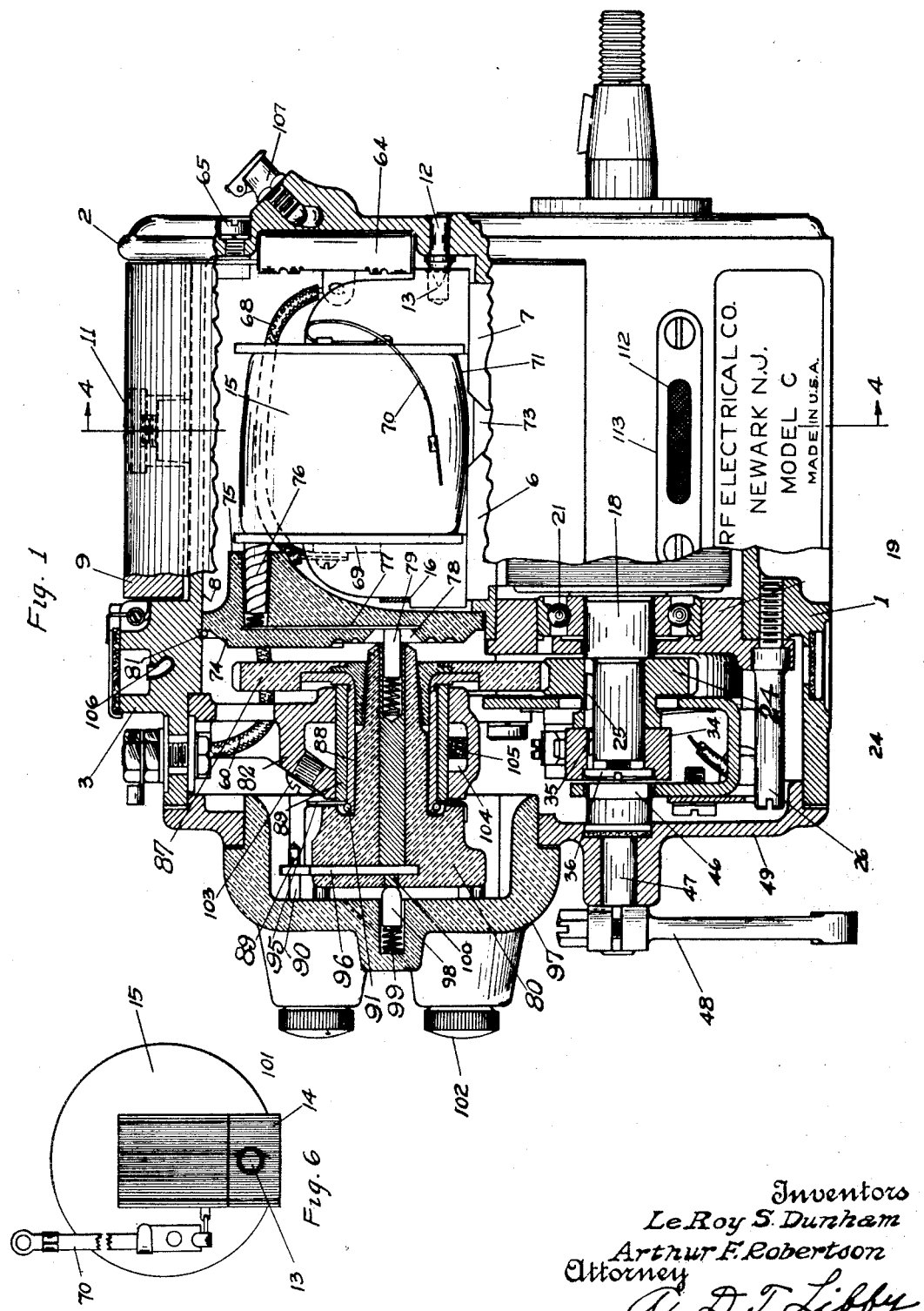
Inventors
LeRoy S. Dunham
Arthur F. Robertson
Attorney
A. D. J. Libby Nov. 15, 1932.                  LE ROY S. DUNHAM ET AL                1,887,624
                                  MAGNETO ELECTRIC GENERATOR
                              Filed Nov. 4, 1930        3 Sheets-Sheet 2
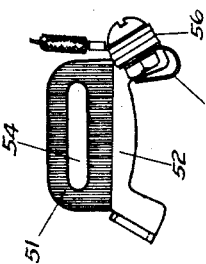
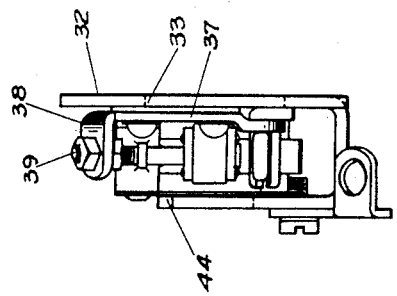
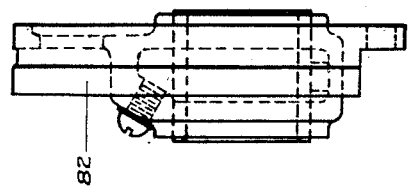
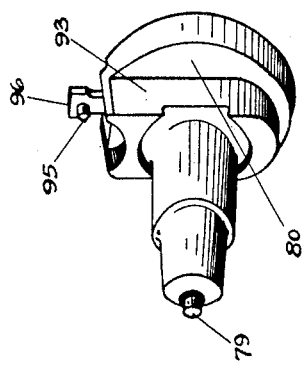
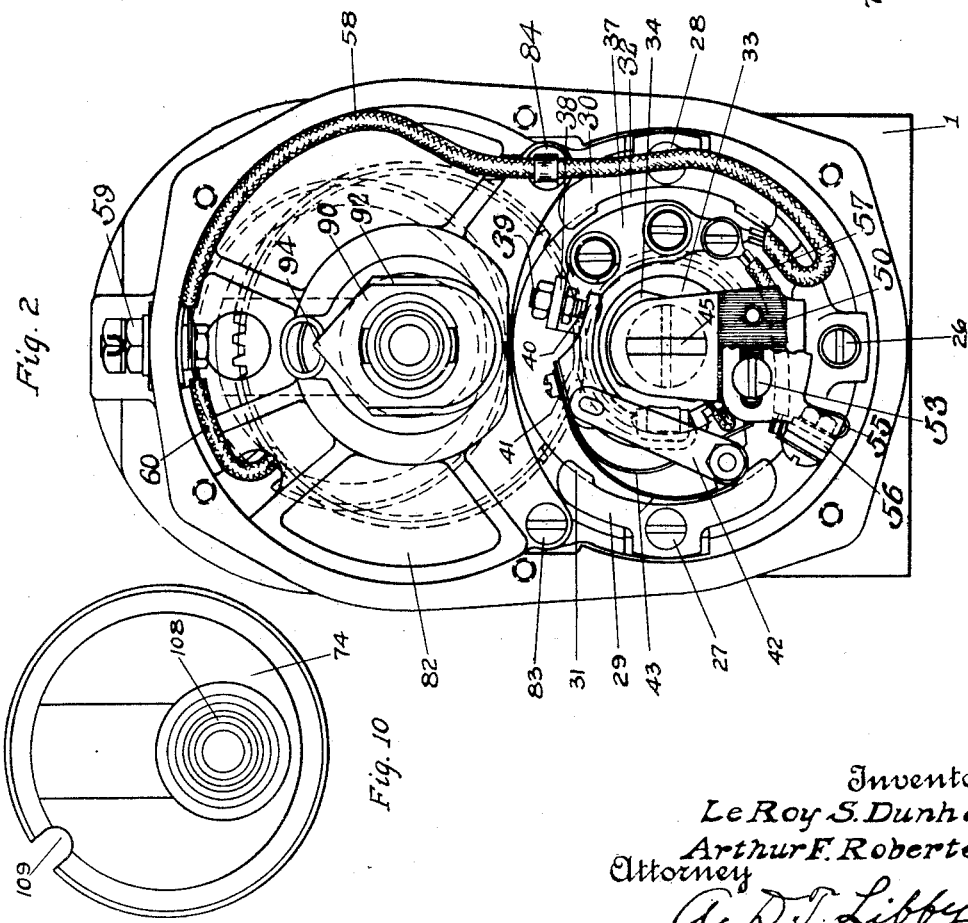
Inventors
LeRoy S. Dunham
Arthur F. Robertson
Attorney
A. D. T. Libby

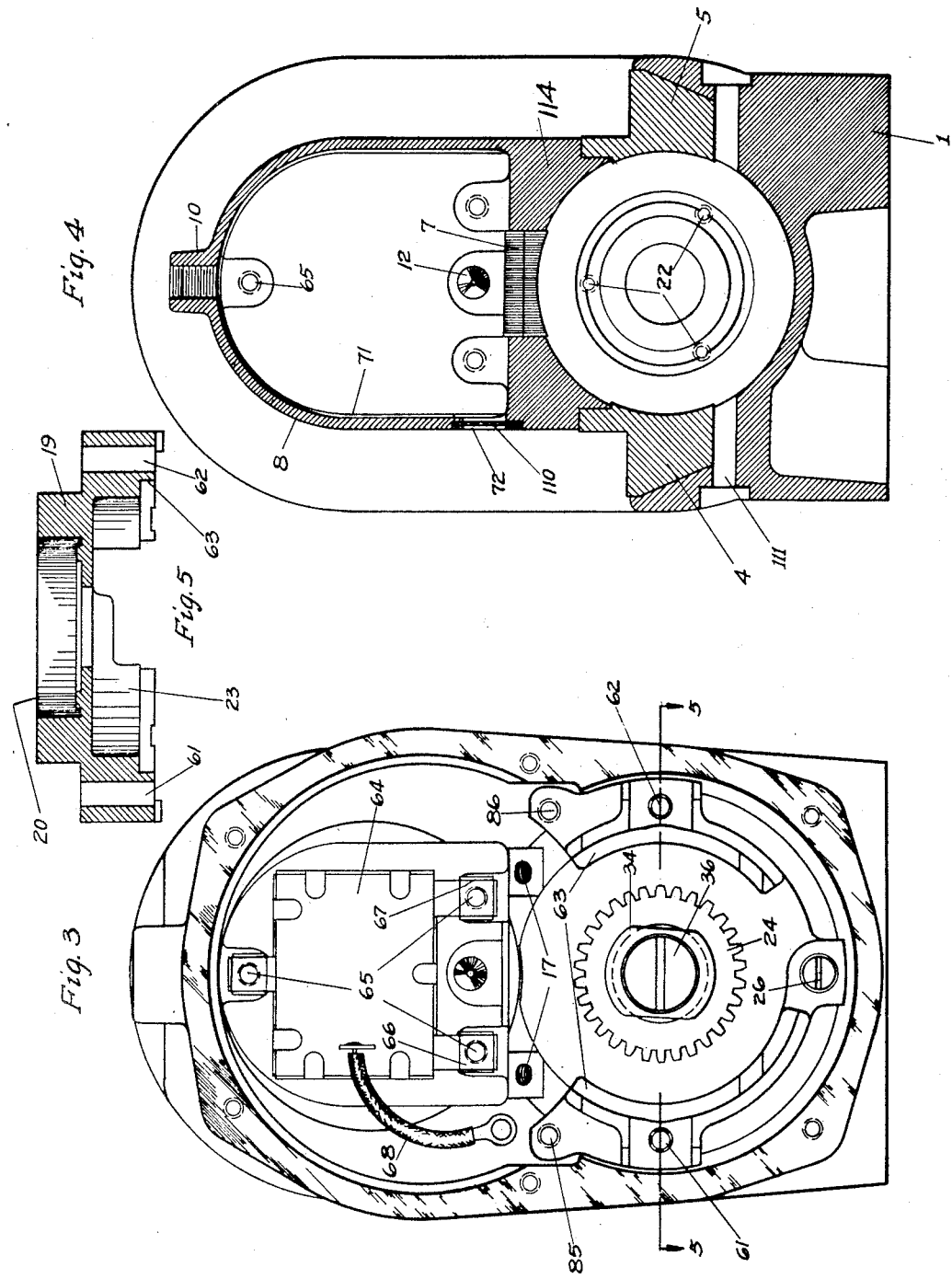

Patented Nov. 15, 1932

1,887,624

UNITED STATES PATENT OFFICE

LE ROY S. DUNHAM, OF EAST ORANGE, AND ARTHUR F. ROBERTSON, OF BELLEVILLE, NEW JERSEY, ASSIGNORS TO SPLITDORF ELECTRICAL COMPANY, OF NEWARK, NEW JERSEY, A CORPORATION OF NEW JERSEY

MAGNETO ELECTRIC GENERATOR

Application filed November 4, 1930. Serial No. 493,280.

This invention relates to the design of a magneto electric generator such as used for ignition purposes.

In U. S. Letters Patent 1,477,843, issued December 18, 1923, to Edward B. Nowosielski, there is shown and described a magneto electric generator in which the base structure includes permanent magnet pole pieces disposed on opposite sides of the base structure, and coil core pole pieces disposed in a plane above and intermediate the magnet pole pieces, the coil core resting on these intermediate pole pieces in a direction parallel to the rotor which distributes the magnetic flux in the magnet field pole pieces through the coil core by way of the coil core pole pieces.

The said patent also shows and describes certain forms of end plates associated with the base member. Other details relating to the distributor block and circuit breaker are likewise illustrated and described in said patent.

The principal object of our invention is to improve on many of the details entering into the construction of an entire magneto, while still utilizing the same magnetic field and current generating coil arrangements set forth in said patent.

Other and ancillary objects will be clear to one skilled in the art after a study of the specification taken in connection with the annexed drawings, wherein:

Figure 1 is a part longitudinal, sectional, and elevational view of the magneto.

Figure 2 is a view of the timer-distributor end of the magneto with the front plate and distributor block and distributor finger removed, but showing the timer in position.

Figure 3 is a view from the same end of the machine as Figure 2, but with the timer-distributor bearing and generating coil structure removed.

Figure 4 is a sectional view through the machine on line 4—4 of Figure 1, but with the magnet and generating coil removed.

Figure 5 is a horizontal, sectional view through the timer and bearing housing only.

Figure 6 is an end view of the generating coil structure.

Figure 7 is a side elevation of the timer structure.

Figure 8 is a plan view of the stop and grounding plate comprising part of the timer or circuit breaker.

Figure 9 is a side elevation of the distributor bearing holder.

Figure 10 is a front view of the high-tension connector conveying current from the ignition coil to the distributor finger.

Figure 11 is a perspective view of the distributor finger.

Referring now to the details, wherein like numbers refer to corresponding parts in the various views, 1 is a unitary housing having portions 2 and 3 simulating end plates and portion 114 comprising a partition in which the pole pieces 6 and 7 form a part. This partition separates the interior of housing 1 into two parts, all being cast integral of suitable metal. In addition, an arch structure 8 is also cast integral with the parts 2 and 3 and serves as a fastening point for the magnet 9 which has a hole therein to receive a projecting lug 10. The lug 10 is tapped to receive a set screw 11 used for holding the magnet in position over the coil-enclosing arch 8, and against the field pole pieces 4 and 5.

Positioned in the portion 2 of the frame is a beveled or wedge-shaped member 12 which is adapted to engage a complementary beveled surface 13 in that end of the core 14 of the ignition coil 15 nearest the portion 2. Preferably, the beveled surface 13 is positioned so that when the coil structure is slipped into place from the open end of the magneto, the cooperation of beveled member 12 and beveled surface 13 causes the coil core end to be pressed into firm contact with the pole piece 7. In one form, the beveled member 12 comprises a beveled pin and the beveled surface 13 comprises a hole which is countersunk on a taper. It is obvious to one skilled in the art that horizontal beveled surfaces, adapted to cooperate as described, comprise another form of the structure. The opposite end of the coil core is fastened to the pole piece 6 by a clamp 16 which is fastened to the magneto structure through the medium of screws entering the holes 17 (see Fig. 3).

The rotor is essentially the rotor described in aforesaid U. S. Letters Patent 1,477,843. The rotor shaft is supported at one end on a ball bearing positioned in portion 2 of the frame with means for removing said ball bearing as will be described hereafter for the bearing at the opposite end of the rotor shaft.

In order to support the end 18 of the rotor shaft, we have provided a separable bearing housing 19, shown in section in Figure 5. The bearing housing 19 is recessed in the back at 20 to receive the ball bearing 21. Preferably, a plurality of holes 22 are provided so as to be able to force the bearing out of the holder 19 at any time desired for the purposes of repair. The bearing holder 19 is also shaped at the back to enter the bore of the frame to centralize the rotor in the bore, and the outer periphery of the bearing holder 19 comprises a flange which abuts the face of portion 3 of housing 1. Shims placed at this junction, space the bearing holder 19 from the face of portion 3 as required to give a proper endwise fit of the main bearings and to permit subsequent adjustment for wear by the removal of such shims as required. This is quite different than the usual practice, wherein shims are inserted between the rotor itself and the bearing which is pressed on to the rotor shaft. In past practice, all adjustments of endplay required the removal of the bearing from the shaft. In our device, such adjustment does not disturb the bearing in its pressed-in location. Moreover, under past practice, wear could be taken up only by the addition of shims which are not always to be had in the field. In our construction, wear is taken up by the removal of a thin section of shim already present.

The front part of the bearing holder 19 has a recess or counter-bore 23 within which functions a pinion 24 fastened to the end of the shaft 18 in any satisfactory manner as by a key 25. The bearing holder 19 is fastened to the framework of the magneto by a stop and grounding stud 26 and two screws 27 and 28 which pass through holes 61 and 62 in the bearing plate. The screws 27 and 28 also support the resilient clamping fingers 29 and 30.

The resilient clamps 29 and 30 have their ends formed at 31 so as to overlap and engage the peripheral edge of the circuit timer or circuit breaker plate 32, holding the same in the recesses 63 within which it turns. The plate 32 is provided with a central hole 33 to receive the cam 34 fastened to the end of the magneto shaft in any satisfactory manner but preferably by a key 35 adapted to engage either one of two keyways in cam 34, whereby the cam may be positioned for either direction of rotation. Also, cam 34 is further fastened to the shaft by a screw 36 which is screwed into the end of the shaft, the head of the screw fitting within a recess in the cam, as shown in Figures 1 and 3. The plate 32 carries the usual insulated contact plate 37 having a lug 38 adjustably supporting a contact screw 39. Cooperating with the contact 39 is a contact 40 carried on a movable breaker arm 41, which arm is also supported on the breaker plate 32, being held in place thereon by a strap 42 and provided with a plurality of operating springs 43.

The breaker plate 32 is provided with an upturned lug 44 having a slot 45 therein to receive the key-shaped end 46 of a subshaft 47 to which is attached the timing lever 48. The subshaft 47 is carried in an end plate 49.

The lug 44 is preferably provided with serrations 50 which coact with cooperative serrations 51 on the plate 52 supported on the lug 44 by means of a pair of screws 53, only one of which is shown in Figure 2, which screws pass through a slot 54 in the plate 52 whereby an adjustable but dependable fastening is secured between lug 44 and plate 52. Plate 52 carries depending ears 56 spaced apart and adapted to engage stop pin 26 for the purpose of suitably limiting and regulating the rotation of the circuit breaker which is carried on circuit breaker plate 32. Anyone skilled in the art will recognize this limitation of the rotation of the circuit breaker as a controlled regulation of the retard and advance of the magneto, and that the extent of the spacing between the ears will govern the manually controlled range of advance of the magneto. Where this spacing is only sufficient for plate 52 to set astride stop pin 26, there is no range of advance and the magneto is said to have a fixed spark, no advance lever 48 or shaft 47 being then required.

By loosening the screws 53, the plate 52 may be shifted on lug 44 so as to adjust the circuit breaker, which is carried on circuit breaker base 32 of which lug 44 is a part, to its proper position. This adjustment simplifies assembly at the time of manufacture, permits taking up for wear incidental to long use, and provides an adjustment which is advantageous in various circumstances of practical use, including the readjustment of the machine for best results when the cam is shifted from one keyway to the other to change the direction of rotation of the magneto. Ear 56 of plate 52 carries, in insulated relationship, spring contact member 55 adapted to engage stop pin 26 when breaker base 32 is rotated to extreme position. Insulated contact spring 55 is connected by conductor 57 to contact terminal plate 37 which in turn is connected by conductor 58 to the high voltage end of the primary of ignition coil 15, this connection being completed by way of a stud 59 and conductor 60. Stud 59 is used to connect conductor 60 to a grounding switch external to the magneto, whereby the sparking of the magneto may be turned on or off in the usual way. Similarly, movement of advance lever 48, and hence breaker base 32, to its extreme position engages spring contact 55 with stop stud 26 to ground the high voltage end of the primary of ignition coil 15 and interrupt the sparking of the magneto. In practice, it is desired that this occurs in that extreme position of the breaker base 32 which is the fully retarded position so called as is well known in the art. Hence, spring contact 55 is mechanically attached to that one of depending ears 56 which is appropriate for the direction of rotation in effect in any given case.

Within the inner surface of the portion 2 of the frame adjacent one end of the coil, is mounted a condenser 64, the same being held in position by screws 65 which engage nuts 66 positioned in upturned ears 67 of the casing of the condenser so that the nuts will not turn. One terminal of the condenser is grounded while the other is connected by a lead 68 to a connecting lug 69 carried on one end of the coil structure to which one end of the primary is connected and also to which the lead 60 extends. The opposite end of the primary is connected by a ground lead 70 to the frame of the magneto by one of the screws that hold the clamp 16 in position. As shown in Figure 1, the ground lead 70 is shown disconnected. In another form, one end of the primary of ignition coil 15 may be connected to core 14 as the coil is manufactured, in which case, ground lead 70 is not required.

In order to prevent leakage of the high-tension current from coil 15 to the arch structure 8, the arch is lined with a piece of insulating material 71 which is bent and slipped into position before the coil structure is put in place. The insulator 71 is slotted at one place so as not to cover the opening 72, and extends across the bottom of the coil between the core ends.

In order to ventilate the arch structure as well as the rotor, an opening 72 is provided which is partly closed by a piece of wire gauze 110, and even though the magnet 9 fits over the opening 72, it does not make an airtight fit with the arch portion 8, and consequently the heated air on the interior of the magneto will find an egress through the opening 72. It will be seen from Figure 1, that there is a space 73 between the pole pieces 6 and 7 so that there will be ventilation through the rotor chamber by way of the openings 111 on the sides of the base, which openings are closed by a piece of wire gauze 112 held in place by plates 113. It may be noted at this point that the openings 111 also serve for timing purposes; that is to say, a gauge is passed through this opening to engage the edge of one of the inductors carried on the rotor, whereby the position of the rotor is determined for properly timing the parts of the magneto.

Positioned in an annular groove in the frame structure, is an insulator 74 having an opening 109 to permit the passage of the conductor 60, and also having a hollow boss 75 extending toward one end of the ignition coil 15. The hollow portion of the boss 75 is adapted to receive and encompass a projecting end 76 of the high-tension winding of the coil structure 15. In the body of the insulator 74, is a conductor 77, the end of which intercepts the hollow opening in the boss 75, and the resilient part of the end 76 of the high-tension winding engages this end of the conductor 77, the opposite end of which is exposed at an opening 78 which opening is preferably surrounded with a plurality of serrations 108 in order to cut down the surface leakage at this point whereby the exposed end of the conductor 77 at this point is engaged by a brush 79 resiliently carried in the end of a distributor finger 80. The insulator 74 is held in position in the said annular groove by means of a snap ring 81 which engages a recess provided for it, as will be seen in Figure 1.

Supported in the hollow part of the frame portion 3, is a distributor bearing member 82, the same being held in place against an annular shoulder by two screws 83 and 84 which enter screw holes 85 and 86 in the upper part of the bearing holder 19 (see Figure 3). The distributor bearing holder 82 carries a distributor gear 87 that in turn is carried on a hollow shaft 88, said shaft being supported by a bushing 89 in the bearing holder 82. On the outer end of the hollow shaft 88 is carried a receiver 90, the same being held in place by a snap ring 91 fitting in a cooperating groove on the end of the hollow shaft 88. The receiver 90 has an upturned flange 92 which is adapted to receive the flat sides 93 of the distributor finger 80, thereby providing a positive drive for the distributor finger.

The receiver 90 is pointed at the upper part 94 (see Figure 2) so as to act as one side of a rotary safety gap in co-operation with a pin 95 carried by a contact member 96, the latter two of which form the other side of the rotary safety gap. The plate 49 carries a distributor block 97 within which is positioned a thrust button 98 resiliently held by a spring 99 against the contact member 100 with which the opposite end of the brush 79 contacts. The outer edge of the contact member 96 passes in close proximity to a plurality of distributor contacts 101 for distributing the spark to the various terminals 102 of the distributor block.

The distributor bearing is oiled by removing the screw 103, which is accessible by removing the distributor block 97. A chamber 104 is provided having a wick 105 therein which feeds lubricant through the wall of a special "compo" bearing to the distributor shaft bearing.

The bearing 21 is lubricated by means of the oil passage 106 which is in the nature of a tube which is cast with the framework of the machine. The drive end bearing is lubricated by means of lubricator 107 and suitable passage leading therefrom to the bearing.

While we have described a preferred distributor mechanism known in the art as a jump spark distributor, it will be obvious that distributor block 97 may carry commutator inserts rather than distributor contacts 101 as described, said inserts adapted to cooperate with a resiliently supported brush carried in distributor finger 80 in lieu of contact member 96. In this form, the distributor would be of the form known as a wipe or brush spark distributor. It is a feature of our magneto that either type of distributor is interchangeably available according to individual preferences or operating circumstances.

Having thus described our invention, what we claim is:

1. In a magneto electric generator having a frame structure carrying two sets of pole pieces, a magnet associated with one set and a stationary current-generating coil having a core associated with the other set, and a rotor carrying inductors for distributing the magnetic flux from the magnet pole pieces to the coil pole pieces, further characterized in that; the frame structure has portions simulating end plates cast integral with the base, said portions being joined by an integral arch structure which completely encloses the generating coil and acts as a positioning means for the magnet.

2. In a magneto electric generator as set forth in claim 1, further characterized in that the arch support is provided with a boss to cooperate with a hole in the magnet to hold the magnet in place on the arch.

3. In a magneto electric generator as set forth in claim 1, characterized in that the arch structure is provided with a boss to cooperate with a hole in the magnet to hold the magnet in place on the arch, and further characterized in that the interior of the arch is fitted with an insulator surrounding the generating coil except on the core pole piece side, and further characterized in that the arch is provided with a ventilating opening.

4. In a magneto electric generator as set forth in claim 1, further characterized in that the end portion of the magneto frame and the cooperating end of the coil core are provided with complementary means for holding said coil core securely against the coil core pole pieces.

5. In a magneto electric generator as set forth in claim 1, further characterized in that a condenser is associated with the generating coil and is mounted within the enclosed arch against one end of the magneto frame adjacent one end of the coil.

6. In a magneto electric generator as set forth in claim 1, further characterized in that only one end of the frame is open whereby the generating coil can be slipped in place within the arch, the closed end of the frame being provided with a positioning pin for engaging the end of the coil core, while the coil core at the open end of the arch is engaged by a strap fastened to the frame thereby holding the generating coil securely in position.

7. In a magneto electric generator as set forth in claim 1, in which the frame is open only at one end and the generating coil is adapted to be slid under the arch of the frame from said open end, and an insulator fitting within a recess at the open end of the arch, said insulator being provided with current-conveying means serving to convey the high-tension current from the generating coil to a distributor spool.

8. A magneto electric generator as set forth in claim 1, wherein only one end of the frame is open, whereby the generating coil can be slipped in place within the arch, an insulator fitting within a recess at the open end of the arch and having a contact member in engagement with the high-tension winding of said coil, a separable distributor bearing holder fitting within a recess adjacent said insulator, a distributor finger carried by said distributor bearing holder and carrying a contact in cooperative position with the contact carried by said insulator, a separable cover plate for the open end of the magneto frame, and a distributor block carried by said cover plate in cooperative relationship with said distributor finger.

9. In a magneto electric generator having a frame structure carrying two sets of pole pieces, a magnet associated with one set and a stationary current-generating coil having a core associated with the other set, and a rotor carrying inductors for distributing the magnetic flux from the magnet pole pieces to the coil pole pieces, further characterized in that; the frame structure has portions simulating end plates cast integral with the base, said portions being joined by an integral arch structure for completely enclosing the generating coil, one end portion of the frame being hollow, whereby the coil may be slipped into position within the arch, said hollow portion housing the following instrumentalities; an insulator carrying contacts for makforth in claim 1, in which the frame is open only at one end and the generating coil and a condenser are mounted within the frame through the open end thereof without disturbing either bearing of the rotor shaft.

23. In a magneto electric generator as set forth in claim 1, in which the housing is formed into two compartments both open only at one end, and each open end is independently and separately closed by a main bearing holder and an insulator respectively.

24. In a magneto electric generator having a housing cast integral with a partition to form two comparaments, said housing having a continuation at one end of the magneto, both compartments being open at the same end only, said open end having a double closing, the first including a bearing holder and an insulator respectively for the separate compartments, and a cover for the second closure attached to said continuation of the housing, said cover forming an intermediate space for ventilation, and a circuit breaker and distributor also enclosed by said cover.

25. In a magneto electric generator having a primary current circuit breaker mechanism operating in timed relationship to the magneto rotor wherein the timing relationship is accomplished by rotating the circuit breaking mechanism about the rotor shaft; means for adjusting said timing relationship and dependably securing the adjustment, said means comprising a serrated member integral with the rotatable circuit breaker mechanism, and a member having complementary serrations carried in adjustable clamping engagement with said first-mentioned serrated member, said latter member having parts to engage a stop member on the magneto frame.

26. In a magneto electric generator having a rotor carried on a rotor shaft supported on anti-friction bearings at each end, a bearing-holding plate adapted to project into the bore of the rotor frame to centralize the said rotor in said bore, the bearing holder having an annular flange adapted, in cooperation with the end of the rotor frame, to form a groove for retaining shims whereby the endwise location of the bearing holder may be adjusted to give a proper fit to the bearing and to take up for wear without the necessity of removing the bearings from their holders.

In testimony whereof we affix our signatures.

LE ROY S. DUNHAM.
ARTHUR F. ROBERTSON.

ing circuit connections to the high-tension winding of said coil, a detachable distributor bearing holder carrying a distributor finger, a bearing holder for the rotor of the magneto and a timer mechanism adjustably carried by said bearing holder; a detachable cover plate for the open end of the magneto frame, a distributor block carried by said cover plate for cooperation with said distributor finger, and a timing shaft carried by said cover plate for actuating said timer mechanism.

10. A magneto electric generator as set forth in claim 1, wherein means is provided for ventilating the rotor and coil chambers through said arch structure.

11. A magneto electric generator as set forth in claim 9, further characterized in that the distributor bearing holder is held in place by attachment means engaging upper portions of said bearing holder.

12. A magneto electric generator as set forth in claim 1, further characterized in that one of said end portions is hollow and has positioned therein, a holder carrying a rotor bearing and circuit breaker mechanism, and a distributor bearing holder mounted in the upper part of said hollow portion, carrying a distributor gear and distributor finger; and an end plate fitting over the outer surface of said end portion, a distributor block carried by said end plate to cooperate with said distributor finger, and a timing shaft carried by the end plate for actuating said timer mechanism.

13. A magneto electric generator as set forth in claim 1, still further characterized in that one of said end portions is hollow and has positioned in the lower part thereof, a holder having recesses on opposite sides, one of said recesses being adapted to receive a rotor bearing therein, while the other is adapted to receive a driving pinion carried on the rotor shaft, said holder also adjustably carrying a circuit breaker mechanism, a distributor bearing holder mounted in the upper part of said hollow portion and carrying a distributor gear in mesh with said pinion, and a distributor finger in electrical engagement with said generating coil; an end plate fitting over the outer surface of said end portion, a distributor block and a timing shaft carried by said end plate.

14. In a magneto electric generator having a distributor shaft; a receiver disc, having upturned edges for the greater part of its periphery, mounted on the outer periphery of said shaft, and a distributor finger having a portion formed to fit within the upturned sides of said receiver.

15. In a magneto electric generator as set forth in claim 14, further characterized in that the receiver is pointed at one end to cooperate with a pin carried by the distributor finger to form a rotating spark gap.

16. In a magneto electric generator having a timer mechanism further characterized in that said mechanism includes a plate having stationary and movable contact members thereon, and an upturned lug, said lug having an aperture therein to receive the end of a timing shaft and also being provided with an adjustable member acting as a stop for the movement of the timer mechanism.

17. In a magneto electric generator as set forth in claim 16, further characterized in that the upturned lug and adjustable member mounted thereon are provided with serrations to get close adjustment of said member on said lug and to assist in holding said parts securely together.

18. In a magneto electric generator as set forth in claim 16, further characterized in that the member carried on the said lug is provided with ears carrying a grounding contact, and a stud attached to the frame of the magneto adapted to be engaged by said grounding contact.

19. In a magneto electric generator of the inductor-rotor type, characterized in that the frame structure, including the housing for the rotor and portions simulating end plates, are all cast integral, said end plate portions being joined by an integral arch structure and a generating coil completely enclosed within the arch structure, said arch structure acting as a support for the magnet.

20. A magneto electric generator as set forth in claim 19, further characterized in that only one end of the frame is open whereby the generating coil can be slipped in place within said arch, an insulator fitting within a recess of the open end of the arch provided with means for making connection to the high-tension winding of said coil, a detachable distributor bearing holder fitting within a recess adjacent said insulator, a distributor finger carried by said distributor bearing holder provided with means for picking up the high-tension current from said insulator, a detachable bearing holder for the rotor mounted below said distributor bearing holder, a timer mechanism, a circuit breaker mechanism adjustably carried by said bearing holder, a detachable cover plate at the open end of the magneto frame, a distributor block carried by said cover plate for cooperation with said distributor finger, and a timing shaft carried by said cover plate to actuate said timer mechanism.

21. In a magneto electric generator as set forth in claim 1, further characterized in that the frame structure is a housing having portions simulating end plates and a portion acting as a partition separating the housing into two parts, said portions being formed integral with the base and with an arch structure which completely encloses the top compartment and acts as a point of attachment for the magnet.

22. In a magneto electric generator as set